(12) United States Patent
Sakaniwa et al.

(10) Patent No.: US 7,298,417 B2
(45) Date of Patent: Nov. 20, 2007

(54) SIGNAL PROCESSING APPARATUS, SIGNAL PROCESSING METHOD, PROGRAM, AND RECORDING MEDIUM

(75) Inventors: Katsuyuki Sakaniwa, Hyogo (JP); Hiroshi Saitoh, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 526 days.

(21) Appl. No.: 10/946,481

(22) Filed: Sep. 21, 2004

(65) Prior Publication Data

US 2005/0052572 A1 Mar. 10, 2005

Related U.S. Application Data

(63) Continuation of application No. PCT/JP03/05564, filed on May 1, 2003.

(30) Foreign Application Priority Data

May 7, 2002 (JP) .............................. 2002-131221

(51) Int. Cl.
*H04N 7/00* (2006.01)
(52) U.S. Cl. .................................... 348/441
(58) Field of Classification Search ................ 348/441, 348/458, 473, 474, 459, 475; 386/52, 62
See application file for complete search history.

(56) References Cited

U.S. PATENT DOCUMENTS 5,633,687 A * 5/1997 Bhayani et al. ............. 348/441
5,956,090 A * 9/1999 Yamauchi ................... 348/441
6,034,731 A * 3/2000 Hurst, Jr. ............... 375/240.26
6,177,922 B1 * 1/2001 Schiefer et al. ............ 345/698
2003/0031461 A1 * 2/2003 Takayama .................... 386/52

FOREIGN PATENT DOCUMENTS

| JP | 10-66036 | 3/1998 |
|----|----------|--------|
| JP | 2001-54066 | 2/2001 |
| JP | 2002-77797 | 3/2002 |

OTHER PUBLICATIONS

International Search Report corresponding to application No. PCT/JP03/05564 dated Sep. 9, 2003.

* cited by examiner

*Primary Examiner*—Paulos Natnael
(74) *Attorney, Agent, or Firm*—RatnerPrestia

(57) ABSTRACT

A frame rate converting apparatus provided with: a frame rate converter performing conversion of frame rate information on a frame rate, on all, a single or a plurality of sections of a video signal having an input time code which video signal is externally inputted and generated by use of a frame rate that changes or does not change; a time code calculator performing calculation of an output time code to be replaced with the input time code, on all, single or plurality of sections where the conversion of the frame rate information is performed; and a time code generator assigning the calculated output time code to all, single or plurality of sections where the conversion of the frame rate information is performed.

13 Claims, 11 Drawing Sheets

SIGNAL PROCESSING APPARATUS, SIGNAL PROCESSING METHOD, PROGRAM, AND RECORDING MEDIUM

This application is a continuation of International Application No. PCT/JP03/05564, filed May 1, 2003.

TECHNICAL FIELD

The present invention relates to a signal processing apparatus, a signal processing method, a program and a recording medium used when frame rate conversion is performed.

BACKGROUND ART

Methods of performing frame rate conversion by performing, on a film image, 2:3 pulldown to NTSC or conversion from NTSC to PAL and methods of performing such frame rate conversion with efficiency have been proposed to a large extent.

These methods are characterized in that the image length before conversion and the image length after conversion are the same because frame insertion or thinning-out is performed so that the number of frames is changed before and after conversion.

On the other hand, a method is known where the image length is different between before and after conversion because frame insertion or thinning-out is not performed and the number of frames is not changed between before and after conversion (frame rate conversion method where an image after conversion is either slow motion or fast-forward of an image before conversion).

For example, a system has been proposed that realizes a smooth 1/2.5 slow-motion playback by converting an image shot at a frame rate of 60 frames per second into an image of 24 frames per second.

Moreover, a variable-speed frame rate shooting camera has been proposed where the user can freely change the frame rate at the time of shooting.

Images shot by such a variable-speed frame rate shooting camera are recorded, for example, such that a scene is recorded at 60 frames per second and another scene, at 12 frames per second.

Moreover, a frame rate conversion system for a variable-speed frame rate shooting camera has been proposed.

For example, when the above-mentioned image is converted into an image of 24 frames per second, a scene recorded at 60 frames per second is converted into an image in a slow motion of 1/2.5 and a scene of 12 frames per second is converted into an image at double speed.

In such a frame rate conversion system, the way time codes are attached to the image after conversion is important.

Specifically, since frame rate conversion changes the number of frames that are displayed in one second, time code conversion is essential.

In the frame rate conversion such that the image length is different between before and after conversion, there is a possibility that not only the time codes of the lowest two digits (the frame number at the corresponding hour, minute, and second) but also the time codes of the other digits (hour, minute, and second) are changed.

For example, when conversion to an image of 24 frames per second is performed by a conversion method where an image length is the same between before and after conversion, a frame assigned a time code 01:15:24:30 in an image of 60 frames per second is assigned a time code 01:15:24:12 (three of every five frames are removed in the thinning-out).

Needless to say, when conversion is performed by a conversion method where an image length is different between before and after conversion, a time code such as 01:15:24:XX is not always assigned to the frame.

It takes much time to manually assign time codes so that overlapping is avoided while establishing correspondence with time codes before conversion.

DISCLOSURE OF INVENTION

Therefore, the inventor considers that it is desirable to automatically re-assign time codes at the time of frame rate conversion processing without manually assigning the time codes.

However, a standard method of calculating time codes in such a case where image length is different between before and after frame rate conversion has not been established yet.

It is considered that when an image shot at a variable-speed frame rate is frame-rate-converted and the output image is used for editing as an image material, it is desirable to convert only the necessary section. This is because it is unnecessary to search for obvious N.G. images at the time of editing and consequently, editing can be performed with efficiency.

In view of the above-mentioned conventional problem, an object of the present invention is to provide a signal processing apparatus, a signal processing method, a program and a recording medium capable of automatically assigning time codes after conversion to a frame-rate-converted image.

A first aspect of the present invention is a signal processing apparatus comprising:

frame rate information converting means of performing conversion of frame rate information on a frame rate, on all, a single or a plurality of sections of a video signal having an input time code, the video signal being externally inputted and generated by use of a frame rate that changes or does not change;

output time code calculating means of performing calculation of an output time code to be replaced with the input time code, on all, single or plurality of sections where the conversion of the frame rate information is performed; and output time code assigning means of assigning the calculated output time code to all, single or plurality of sections where the conversion of the frame rate information is performed, wherein the conversion of the frame rate information is performed, on the sections of the video signal, so that the number of frames of the video signal is not changed between before and after the conversion of the frame rate information.

A third aspect of the present invention is a signal processing apparatus according to the first aspect of the present invention, further comprising input time code content detecting means of performing detection of a content of the input time code, on all, single or plurality of sections, wherein the calculation of the output time code is performed in consideration of a result of the detection of the content of the input time code.

A fourth aspect of the present invention is a signal processing apparatus according to the third aspect of the present invention, wherein the output time code assigned to the sections is calculated so that the output time code assigned to a starting frame where the sections are started substantially coincides with the input time code detected on the starting frame.

A fifth aspect of the present invention is a signal processing apparatus according to the fourth aspect of the present invention, further comprising output time code adjusting means of adjusting the output time code assigned to the starting frame.

A sixth aspect of the present invention is a signal processing apparatus according to the first aspect of the present invention, wherein the output time code assigned to a predetermined section of the plurality of sections is calculated so as to be continuous with the output time code assigned to a section, of the plurality of sections, that immediately precedes the predetermined section.

A seventh aspect of the present invention is a signal processing apparatus according to the first aspect of the present invention, wherein the output time code assigned to the single or plurality of sections is calculated so as to be continuous with the output time code to be assigned to a virtual section from a predetermined reference frame to a starting frame where the sections are started.

An eighth aspect of the present invention is a signal processing apparatus according to the first aspect of the present invention, wherein the output time code assigned to the single or plurality of sections is calculated so as to substantially coincide with the output time code to be collectively assigned to a virtual section including the single or plurality of sections.

A ninth aspect of the present invention is a signal processing apparatus according to the first aspect of the present invention, further comprising input time code predetermined bit storing means of performing storage of the detected input time code into a predetermined bit, on all, single or plurality of sections where the conversion of the frame rate information is performed.

A tenth aspect of the present invention is a signal processing apparatus according to the first aspect of the present invention, wherein the externally inputted video signal is generated by use of a frame rate that changes, frame rate change detecting means of performing detection of a change of the frame rate on the externally inputted video signal is further provided, and the calculation of the output time code is performed in consideration of a result of the detection of a change of the frame rate.

An eleventh aspect of the present invention is a signal processing apparatus according to the tenth aspect of the present invention, wherein the output time code is calculated so as to be in a one-to-one correspondence with the input time code, and input time code reversely calculating means of reversely calculating the input time code from the output time code based on a correspondence of the one-to-one correspondence is further provided.

A twelfth aspect of the present invention is a signal processing method comprising:

a frame rate information converting step of performing conversion of frame rate information on a frame rate, on all, a single or a plurality of sections of a video signal having an input time code, the video signal being externally inputted and generated by use of a frame rate that changes or does not change;

an output time code calculating step of performing calculation of an output time code to be replaced with the input time code, on all, single or plurality of sections where the conversion of the frame rate information is performed; and an output time code assigning step of assigning the calculated output time code to all, single or plurality of sections where the conversion of the frame rate information is performed.

A thirteenth aspect of the present invention is a program of causing a computer to execute the following steps of the signal processing method according to the twelfth aspect of the present invention: a frame rate information converting step of performing conversion of frame rate information on a frame rate, on all, a single or a plurality of sections of a video signal having an input time code, the video signal being externally inputted and generated by use of a frame rate that changes or does not change; an output time code calculating step of performing calculation of an output time code to be replaced with the input time code, on all, single or plurality of sections where the conversion of the frame rate information is performed; and an output time code assigning step of assigning the calculated output time code to all, single or plurality of sections where the conversion of the frame rate information is performed.

A fourteenth aspect of the present invention is a recording medium holding the program according to the thirteenth aspect of the present invention, said recording medium being computer-processable.

EXPLANATION OF REFERENCE NUMERALS

Figure 1:
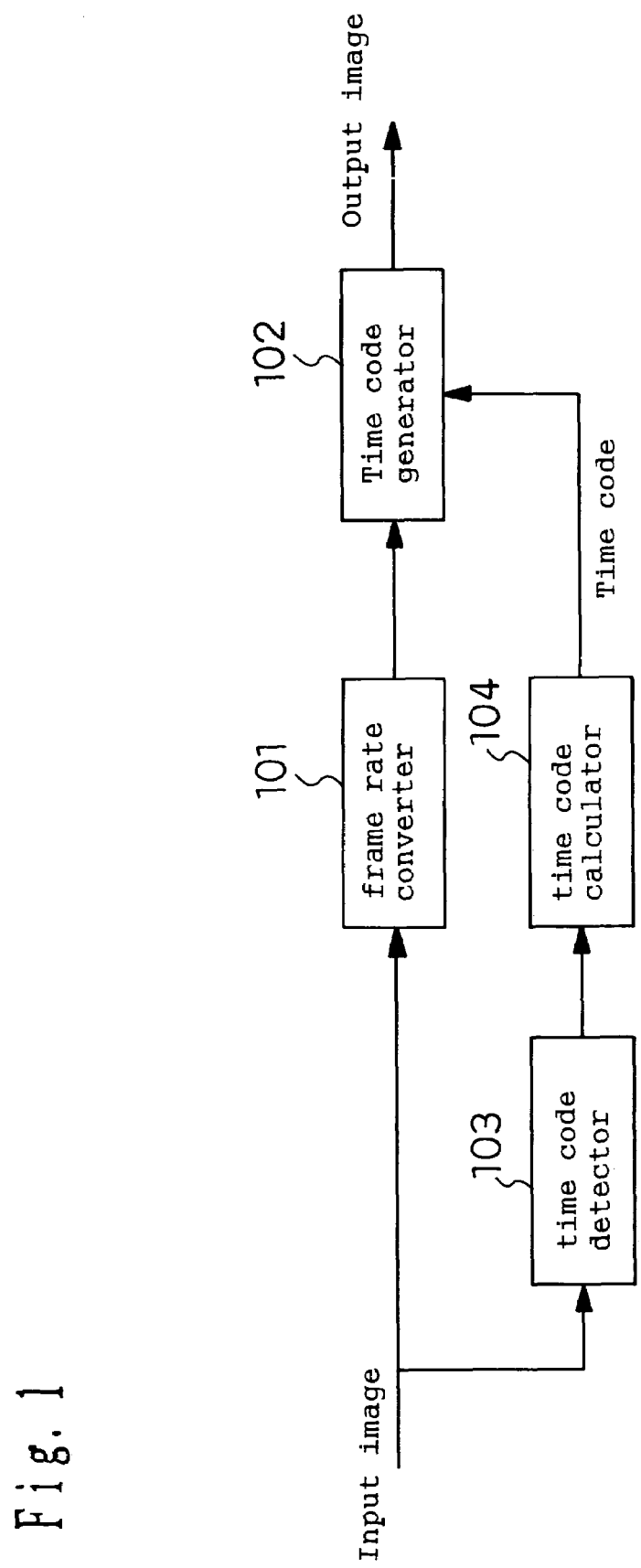
FIG. 1 is a structural view of a frame rate converting apparatus according to a first embodiment of the present invention.

101 frame rate converter
102 time code converter
103 time code detector
104 time code calculator

BEST MODE FOR CARRYING OUT THE INVENTION

Hereinafter, embodiments according to the present invention will be described with reference to the drawings.

First Embodiment

First, the structure of a frame rate converting apparatus of the present invention will be described with reference mainly to FIG. 1 which is a structural view of a frame rate converting apparatus of a first embodiment of the present invention.

A frame rate converter 101 is means of performing frame rate conversion of an input image (performing conversion of frame rate information written in the header of the input image).

A time code generator 102 is means of replacing time codes in an input image with time codes in an output image.

A time code detector 103 is means of detecting time codes (input time codes) from an input image with time codes.

A time code calculator 104 is means of calculating time codes in an output image (output time codes) by use of detected time codes in an input image, the frame rate of an input image, the frame rate of an output image and the like.

More specifically, to determine the time code at the starting point of conversion in an output image, a processing of adopting the time code at the starting point of conversion in an input image as the time code at the starting point of conversion in an output image is performed as the processing of the time code calculator 104.

Then, the time code calculator 104 determines the time code at the starting point of conversion in an output image, and successively increments the time code so as to interlock with the output image.

The frame rate converter 101 corresponds to the frame rate information converting means of the present invention, the time code calculator 104 corresponds to the output time code calculating means of the present invention, and the time code generator 102 corresponds to the output time code assigning means of the present invention. Moreover, the time code detector 103 corresponds to the input time code content detecting means of the present invention. Moreover, the frame rate converting apparatus of the present embodiment corresponds to the signal processing apparatus of the present invention.

Next, the operation of the frame rate converting apparatus of the present embodiment will be described with reference mainly to FIG. 5 which is an explanatory view of the time code conversion of the first embodiment of the present invention. An embodiment of the signal processing method of the present invention will also be described while the operation of the frame rate converting apparatus of the present embodiment is described (this applied to other embodiments).

A case where an image shot at 30 frames per second is converted into an image of 24 frames per second will be described in the following (in the following embodiment, neither frame insertion nor thinning-out is performed and the number of frames is not changed between before and after conversion).

Specifically, a case where the following sections of the input image are converted will be described: a section ① from 00:04:00:00 to 00:08:00:00; and a section ② from 00:16:00:00 to 00:22:00:00.

For simplicity, a case where nondrop frame time codes are calculated will be described.

Figure 5:
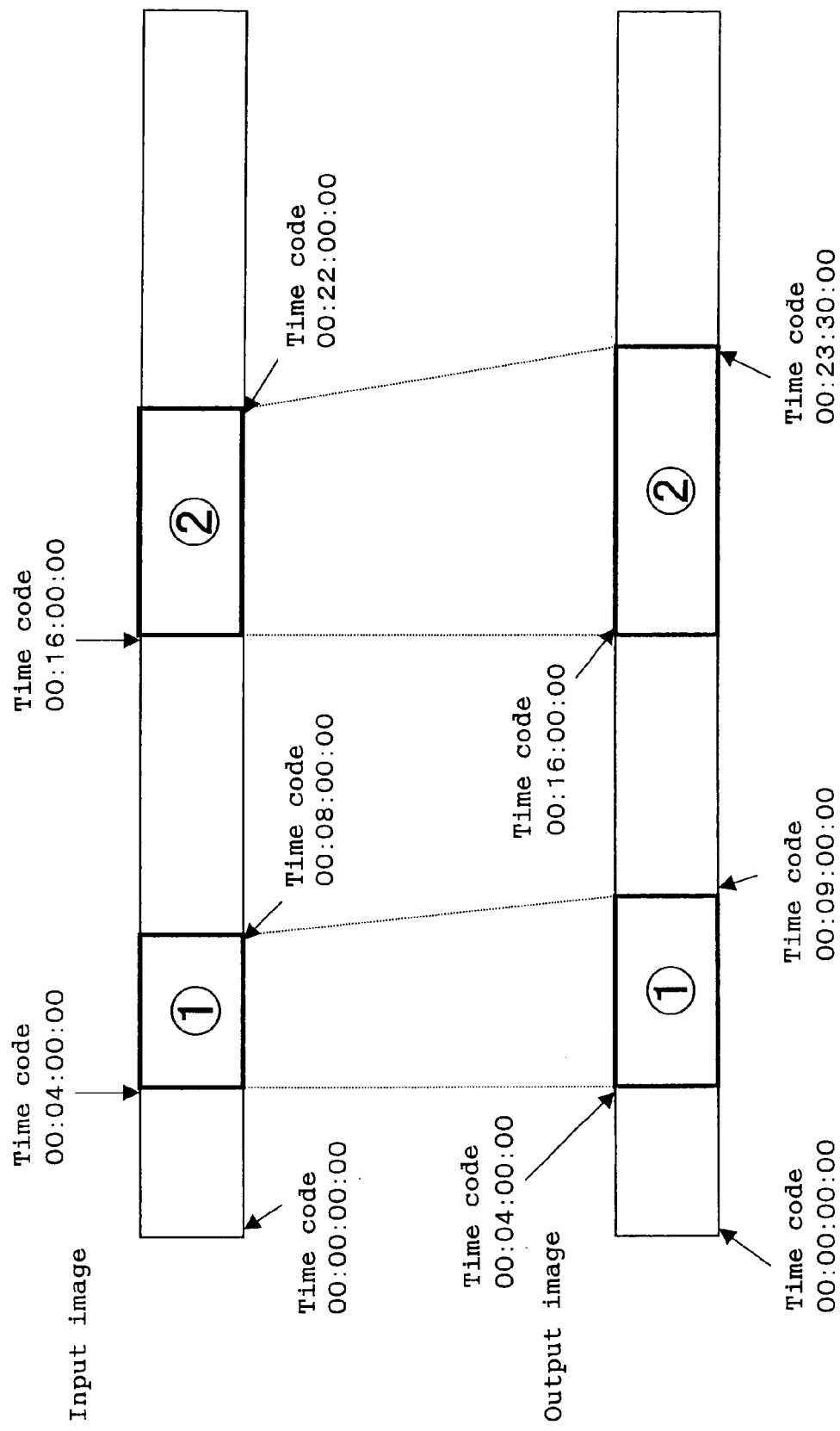
FIG. 5 is an explanatory view of the time code conversion according to a first embodiment of the present invention.

In FIG. 5, the time codes at the starting points of the sections ① and ② of the input image coincide with those at the starting points of the sections ① and ② of the output image.

The playback time of an image of 24 frames per second is 1.25 times longer than that of an image of 30 frames per second.

Consequently, the length of the section ① of the output image is 00:05:00:00 which is 1.25 times 00:04:00:00.

Moreover, the length of the section ② of the output image is 00:07:30:00 which is 1.25 times 00:06:00:00.

Therefore, the time codes in the section ① of the output image are 00:04:00:00 to 00:09:00:00.

Moreover, the time codes in the section ② of the output image are 00:16:00:00 to 00.:23:30:00.

In the above-described time code conversion, although the time codes in the output image are dependent on the conversion section, an advantage is obtained such that the time codes in the input image can be easily inferred from the time codes in the output image and this is sensuously easy for the user to understand.

(A) When the time code at the starting point of the section ① of the input image is 00:03:59:29 which is one frame earlier, the time code 00:03:59:29 which is absent in an image of a frame rate of 24 frames per second cannot be adopted as a time code in the output image.

In order that an adoptable time code is obtained, such a time code that cannot be adopted as a time code in the output image may be corrected by rounding to 00 or the like.

For example, when the time code at the starting point of conversion in the input image is 00:03:59:29, rounding to 00 is performed so that the time code at the starting point is 00:03:59:00.

Likewise, when the time code at the starting point is any of 00:03:59:24, 00:03:59:25, ..., and 00:03:59:28, rounding to 00 is also performed so that the time code at the starting point is 00:03:59:00.

In the 2:3 pulldown of converting a film image to NTSC, a so-called A frame is used for indicating a timing of 2:3:2:3.

In the A frame, a time code whose lowest two digits are 00 coincides with the head of the timing of 2:3:2:3.

Therefore, in the time code replacement, a time code ab:cd:ef:gh may be replaced with a time code ab:cd:ef:00 by rounding the frame indication part (the part of the above-mentioned lowest two digits) for the 24P (24 progressive) A frame synchronization.

By performing the above-mentioned rounding to 00, it is ensured that the position of the time code whose lowest two digits are 00 is always the A frame, so that connection with an existing 2:3 pulldown system can be ensured.

Figure 2:
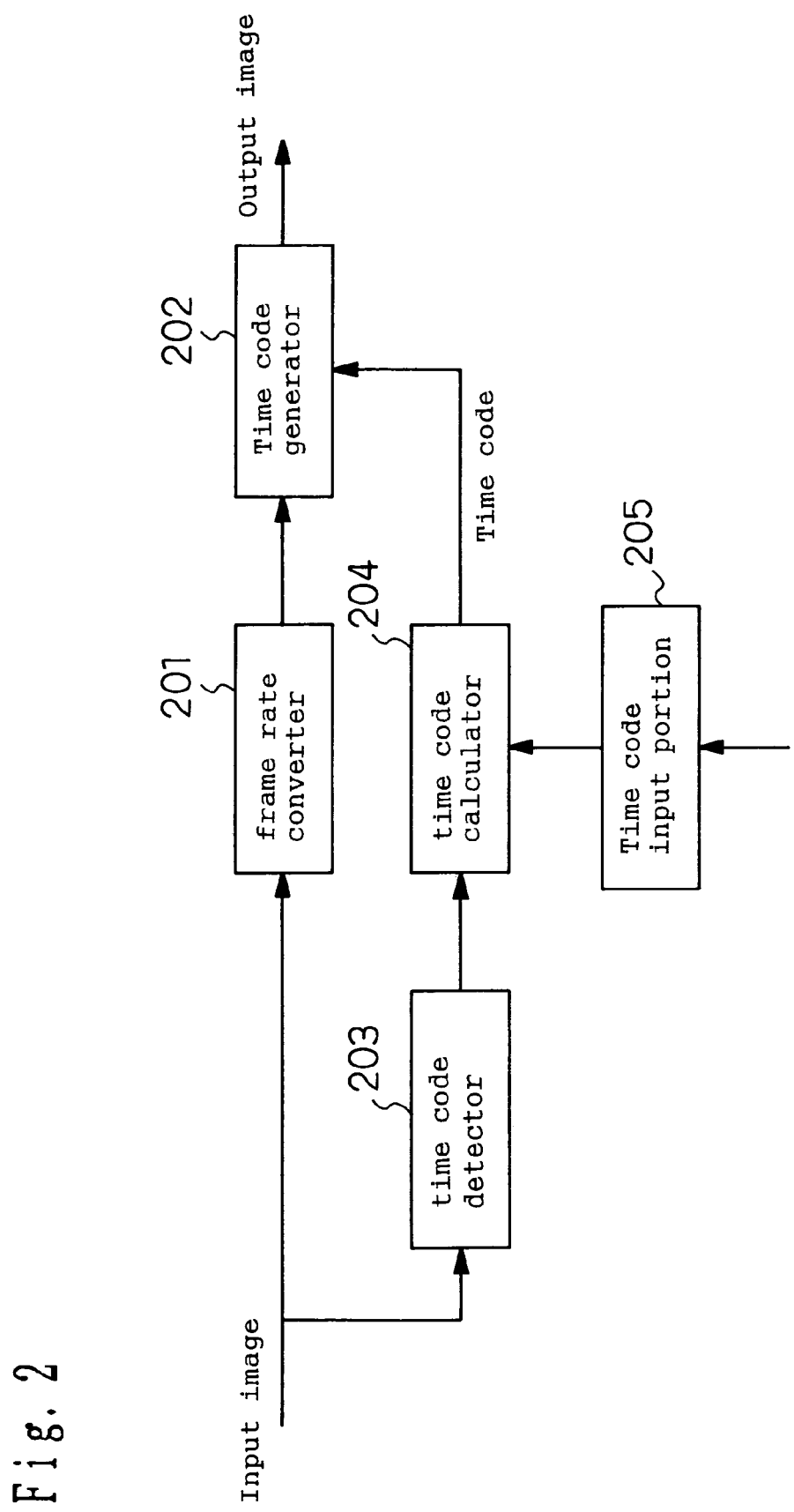
FIG. 2 is a structural view of a frame rate converting apparatus according to an embodiment of the present invention.

(B) As shown in FIG. 2 which is a structural view of a frame rate converting apparatus according to an embodiment of the present invention, a mechanism with which the user can perform external input may be used.

This frame rate converting apparatus has a structure similar to that of the frame rate converting apparatus of the present embodiment (see FIG. 1) (means having the same names have similar functions; this applies to the embodiments described below), and is provided with a time code input portion 205 for the user to manually input a time code to be adopted as the time code at the starting point of conversion in an output image.

The frame rate converter 201 corresponds to the frame rate information converting means of the present invention, the time code calculator 204 corresponds to the output time code calculating means of the present invention, and the time code generator 202 corresponds to the output time code assigning means of the present invention. Moreover, the time code detector 203 corresponds to the input time code content detecting means of the present invention. Moreover, the time code input portion 205 corresponds to the output time code adjusting means of the present invention. Moreover, the frame rate converting apparatus of the present embodiment corresponds to the signal processing apparatus of the present invention.

Consequently, the user can make a fine adjustment of the time code at the starting point of conversion in an output image.

Second Embodiment

First, the structure of a frame rate converting apparatus of the present embodiment will be described.

The structure of the frame rate converting apparatus of the present embodiment is similar to that of the above-described frame rate converting apparatus of the first embodiment.

The present embodiment is characterized in that time codes are calculated so that the time codes in an output image are continuous.

More specifically, in order that the time codes in the output image are continuous in the order in which the time codes are converted, an internal counter is provided in the time code calculator, and a processing of re-assigning the time code at the starting point of conversion in the output image is performed as the processing of the time code calculator.

Figure 6:
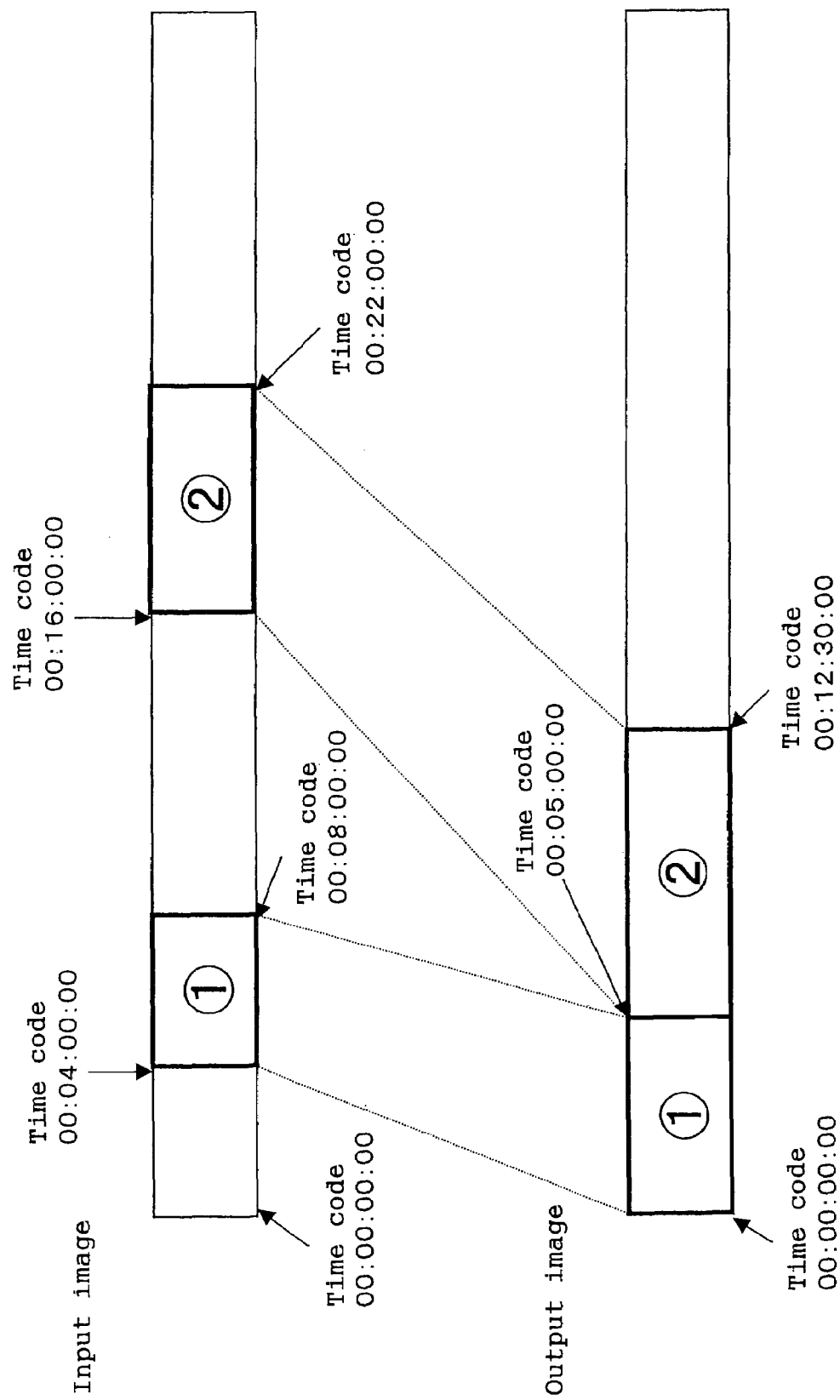
FIG. 6 is an explanatory view of the time code conversion according to a second embodiment of the present invention.

Next, the operation of the frame rate converting apparatus of the present embodiment will be described with reference mainly to FIG. 6 which is an explanatory view of the time code conversion of the second embodiment of the present invention.

As mentioned above, the length of the section ① of the output image is 00:05:00:00, and the length of the section ② of the output image is 00:07:30:00.

With the starting time code of the section ① being 00:00:00:00, the sections ① and ② are placed one after another from the front.

Then, the time codes of the section ① of the output image are 00:00:00:00 to 00:05:00:00, and the time codes of the section ② of the output image are 00:05:00:00 to 00:12:30:00.

By placing the sections ① and ② from the front as described above, the uniqueness of the output time codes can be ensured although the degree of association between the time codes of the input and output is somewhat low.

Third Embodiment

First, the structure of a frame rate converting apparatus of the present embodiment will be described.

The structure of the frame rate converting apparatus of the present embodiment is similar to that of the above-described frame rate converting apparatus of the first embodiment.

The present embodiment is characterized in that the time codes are calculated with provision of a reference frame called a sync point (synchronization point) in the following.

That is, output time codes assigned to a single or a plurality of sections subject to conversion is calculated so as to be continuous with the output time codes to be assigned to a virtual section from a predetermined sync point (reference frame) to the starting point (starting frame) where each of these sections is started.

(When the input image is an image of a fixed frame rate), likewise, the output time codes assigned to a single or a plurality of sections subject to conversion is calculated so as to coincide with the output time codes to be collectively assigned to a virtual section including the single or plurality of sections.

More specifically, a processing of (1) calculating the number of frames from the sync point to the time code at the starting point of conversion in the input image in consideration of the frame rate of the input image, (2) converting the calculated number of frames into time codes in consideration of the frame rate of the output image, and (3) calculating the time code at the starting point of conversion in the output image in consideration of the frame rate of the output image, and (3) calculating the time code at the starting point of conversion in the output image by adding the time codes at the sync points is performed as the processing of the time code calculator.

That is, in order that an equation $$(TI-TS)/FRI = (TO-TS)/FRO \quad \text{(Expression 1)}$$

holds, the time code TO at the starting point of conversion in the output image is calculated. Here, the value of the left side is the number of frames from the sync point to the starting point of conversion in the input image, and the value of the right side is the number of frames from the sync point to the starting point of conversion in the output image.

In (Expression 1), TI is the time code at the starting point of conversion in the input image, TO is the time code at the starting point of conversion in the output image, TS is the time code at the sync point, FRI is the frame rate of the input image, and FRO is the frame rate of the output image.

Figure 7:
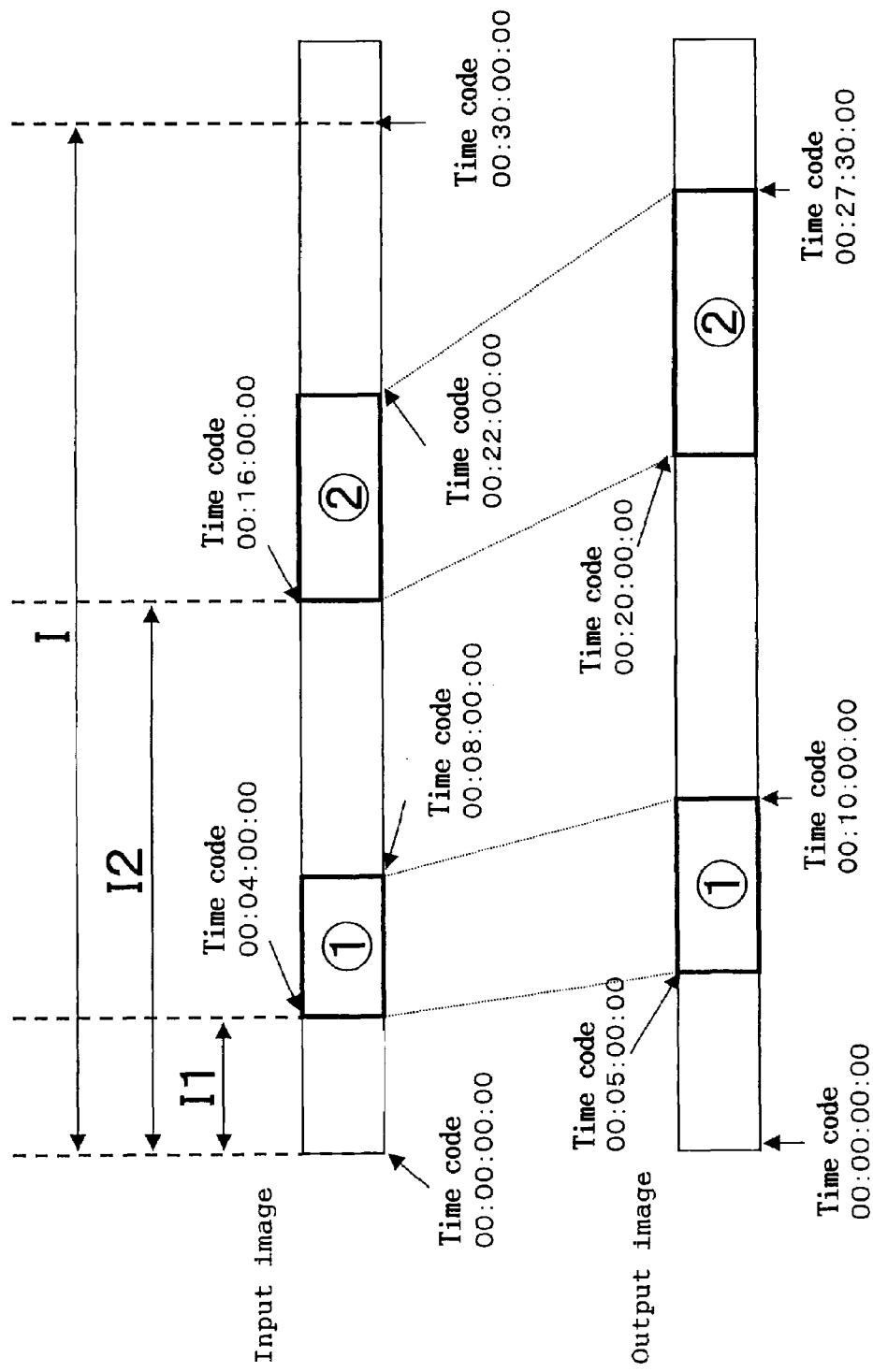
FIG. 7 is an explanatory view of the time code conversion according to a third embodiment of the present invention.

Next, the operation of the frame rate converting apparatus of the present embodiment will be described with reference mainly to FIG. 7 which is an explanatory view of the time code conversion of the third embodiment of the present invention.

The sync point is a point where the time codes in the input image and the time codes in the output image coincide (synchronize) with each other.

In the conversion where the sync point is provided, the number of frames from the sync point is held between before and after conversion.

In the following, a case where the sync point is 00:00:00:00 will be concretely described.

In the image of 30 frames per second before conversion, the number of frames from the sync point to the starting point of the section ① of the input image having a time code 00:04:00:00 is 7200 (=30×4×60). In the image of 24 frames per second after conversion, this frame, which is the 7200th frame from the sync point, has a time code 00:05:00:00.

Since the length of the section ① of the output image is 00:05:00:00 as mentioned above, the time codes of the section ① of the output image are 00:05:00:00 to 00:10:00:00.

Likewise, the time codes of the section ② of the output image are 00:20:00:00 to 00:27:30:00.

Like this, the output time codes assigned to the section ① are calculated so as to be continuous with the output time codes to be assigned to a virtual section I1 from 00:00:00:00 to 00:04:00:00. The output time codes assigned to the section ② are calculated so as to be continuous with the output time codes to be assigned to a virtual section I2 from 00:00:00:00 to 00:16:00:00.

Likewise, the output time codes assigned to the sections ① and ② are calculated so as to coincide, for example, with the output time codes to be collectively assigned to a virtual section I from 00:00:00:00 to 00:30:00:00.

Conversely, in the image of 24 frames per second after conversion, the number of frames from the sync point to the frame having the time code 00:05:00:00 is also calculated to be 7200 (=24×5×60). Therefore, in the image of 30 frames per second before conversion, it can be immediately calculated that this frame, which is the 7200th frame from the sync point, has a time code 00:04:00:00.

That is, the time codes before conversion and the time codes after conversion are in a one-to-one correspondence, and the time codes in the input image can be calculated back (reversely processed) from the time codes in the output image.

By thus providing the sync point, the uniqueness of the output time codes can be ensured (when the input image is an image of a fixed frame rate), so that the input time codes can be easily obtained from the output time codes.

Fourth Embodiment

First, the structure of a frame rate converting apparatus of the present embodiment will be described.

The structure of the frame rate converting apparatus of the present embodiment is similar to that of the above-described frame rate converting apparatus of the first embodiment.

The present embodiment is characterized in that an input image is (not an image of a fixed frame rate but) an image of a variable-speed frame rate.

Next, the operation of the frame rate converting apparatus of the present embodiment will be described with reference mainly to FIG. 8 which is an explanatory view of the time code conversion of the fourth embodiment of the present invention.

In the following, a case where an image of a variable-speed frame rate is converted into an image of 24 frames per second will be described.

Specifically, a case will be described where the image of a variable-speed frame rate is an image that is shot at 30 frames per second from 00:00:00:00 to 00:12:00:00 and at 12 frames per second from 00:12:00:00.

Needless to say, the sections ① and ② are sections in the above-described first embodiment.

Figure 8:
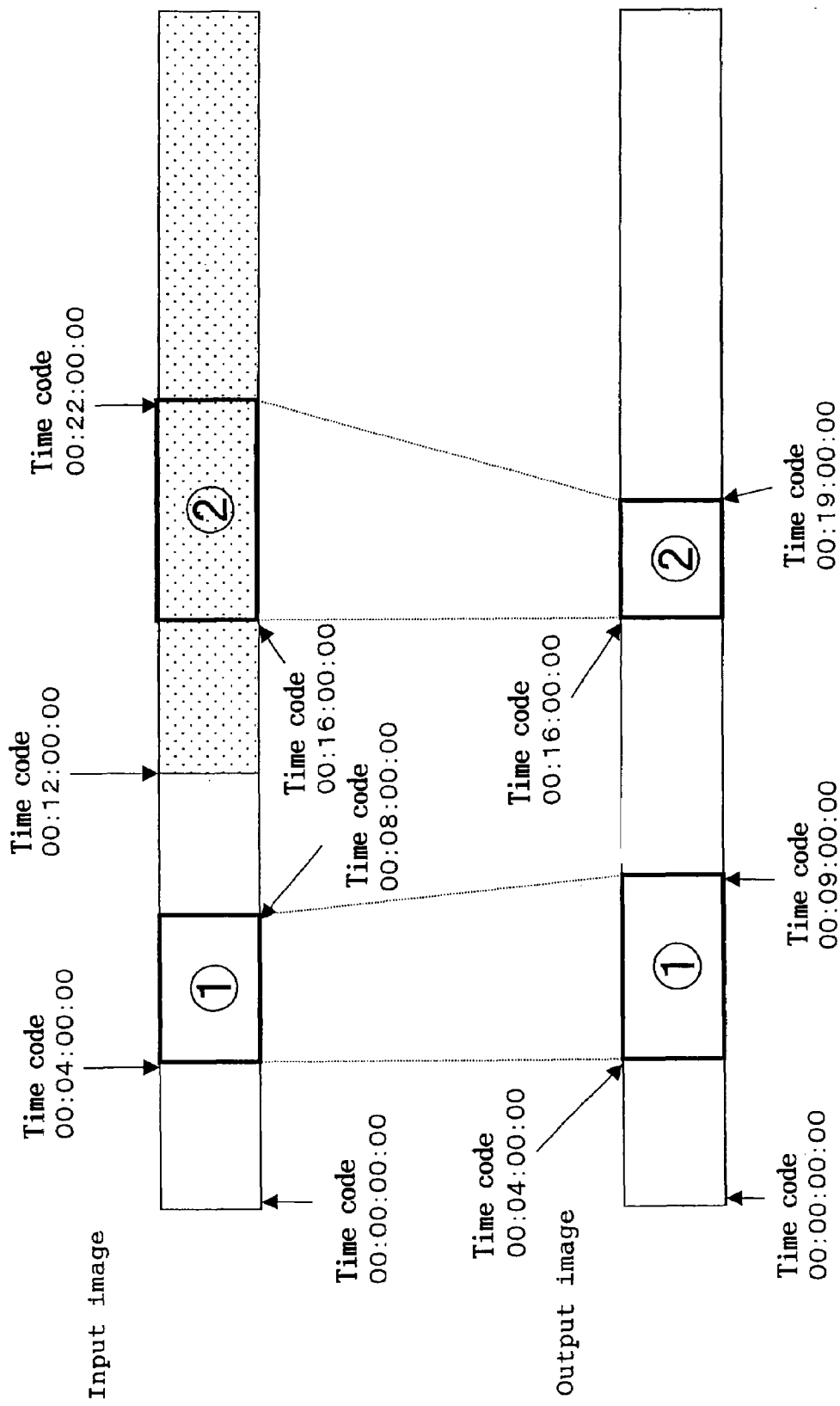
FIG. 8 is an explanatory view of the time code conversion according to a fourth embodiment of the present invention.

In FIG. 8, the time code at the starting point of conversion in the input image coincides with the time code at the starting point of conversion in the output image.

The playback time of the image of 24 frames per second is 1.25 time longer than that of the image of 30 frames per second, and is half that of the image of 12 frames per second.

Consequently, the length of the section ① of the output image is 00:05:00:00 which is 1.25 times 00:04:00:00.

The length of the section ② of the output image is 00:03:00:00 which is half of 0:06:00:00.

Therefore, the time codes of the section ① of the output image remain 00:04:00:00 to 00:09:00:00.

Moreover, the time codes of the section ② of the output image are 00:16:00:00 to 00:19:00:00.

In the above-described time code conversion, like in the above-described case of the first embodiment, although the time codes in the output image are dependent on the conversion section, an advantage is obtained such that the time codes in the input image can be easily inferred from the time codes in the output image and this is sensuously easy for the user to understand.

Fifth Embodiment

First, the structure of a frame rate converting apparatus of the present embodiment will be described.

The structure of the frame rate converting apparatus of the present embodiment is similar to that of the above-described frame rate converting apparatus of the first embodiment.

The present embodiment is characterized in that the input image is a variable-speed frame rate image like the above-described fourth embodiment and that the time codes are calculated so that the time codes in the output image are continuous like the above-described second embodiment.

Figure 9:
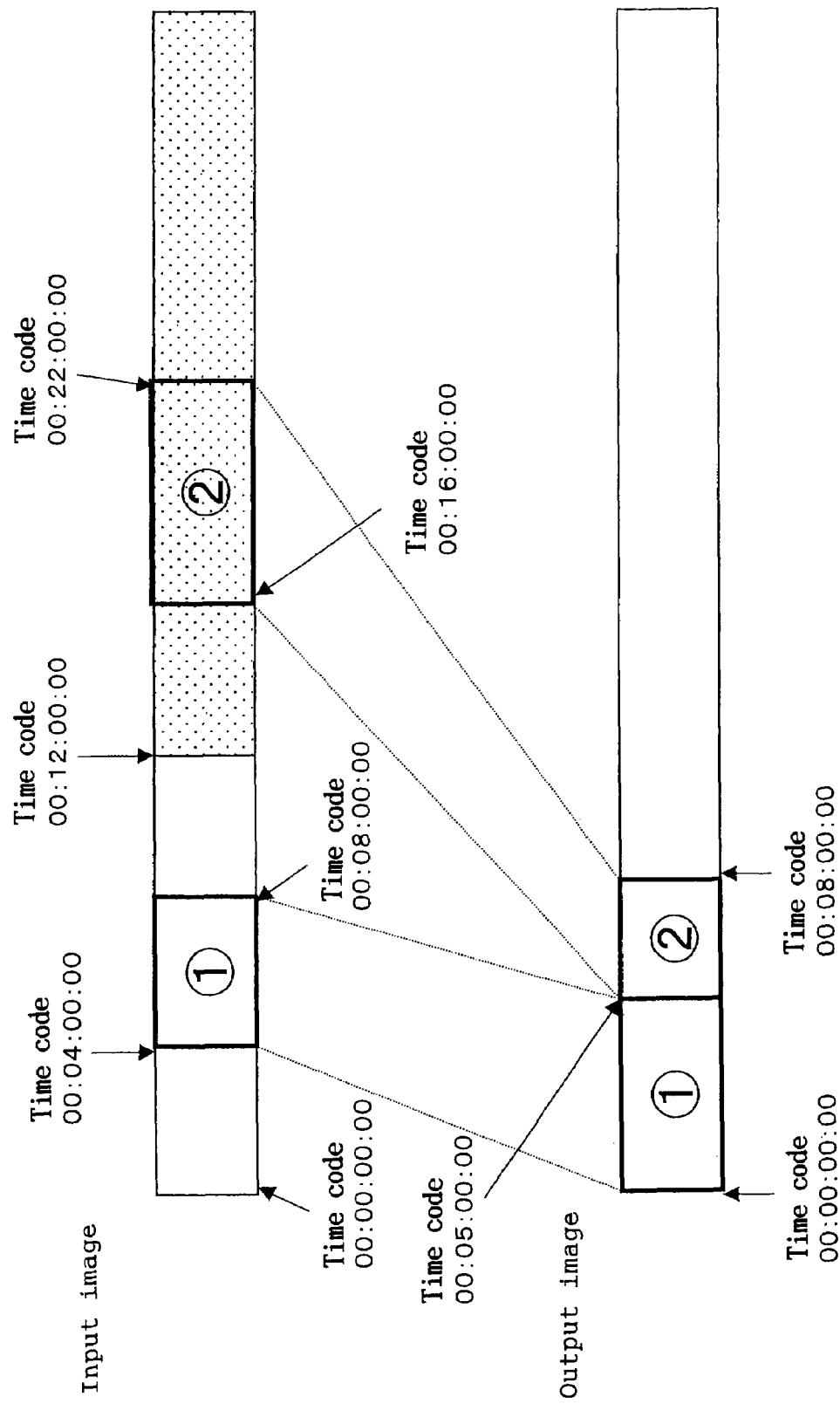
FIG. 9 is an explanatory view of the time code conversion according to a fifth embodiment of the present invention.

Next, the operation of the frame rate converting apparatus of the present embodiment will be described with reference mainly to FIG. 9 which is an explanatory view of the time code conversion of the fifth embodiment of the present invention.

In the following, like in the above-described fourth embodiment, a case will be described where a variable-speed frame rate image (image shot at 30 frames per second from 00:00:00:00 to 00:12:00:00 and at 12 frames per second from 00:12:00:00) is converted into an image of 24 frames per second.

As mentioned above, the length of the section ① of the output image is 00:05:00:00, and the length of the section ② of the output image is 00:03:00:00.

With the starting time code of the section ① being 00:00:00:00, the sections ① and ② are placed one after another from the front.

Then, the time codes of the section ① of the output image are 00:00:00:00 to 00:05:00:00, and the time codes of the section ② of the output image are 00:05:00:00 to 00:08:00:00.

By placing the sections ① and ② from the front as described above, the uniqueness of the output time codes can be ensured although the degree of association between the time codes of the input and output is somewhat low.

Sixth Embodiment

First, the structure of a frame rate converting apparatus of the present embodiment will be described.

The structure of the frame rate converting apparatus of the present embodiment is similar to that of the above-described frame rate converting apparatus of the first embodiment.

The present embodiment is characterized in that the input image is a variable-speed frame rate image like the above-described fourth embodiment and that the time codes are calculated with provision of a sync point (synchronization point) like the above-described third embodiment.

Figure 10:
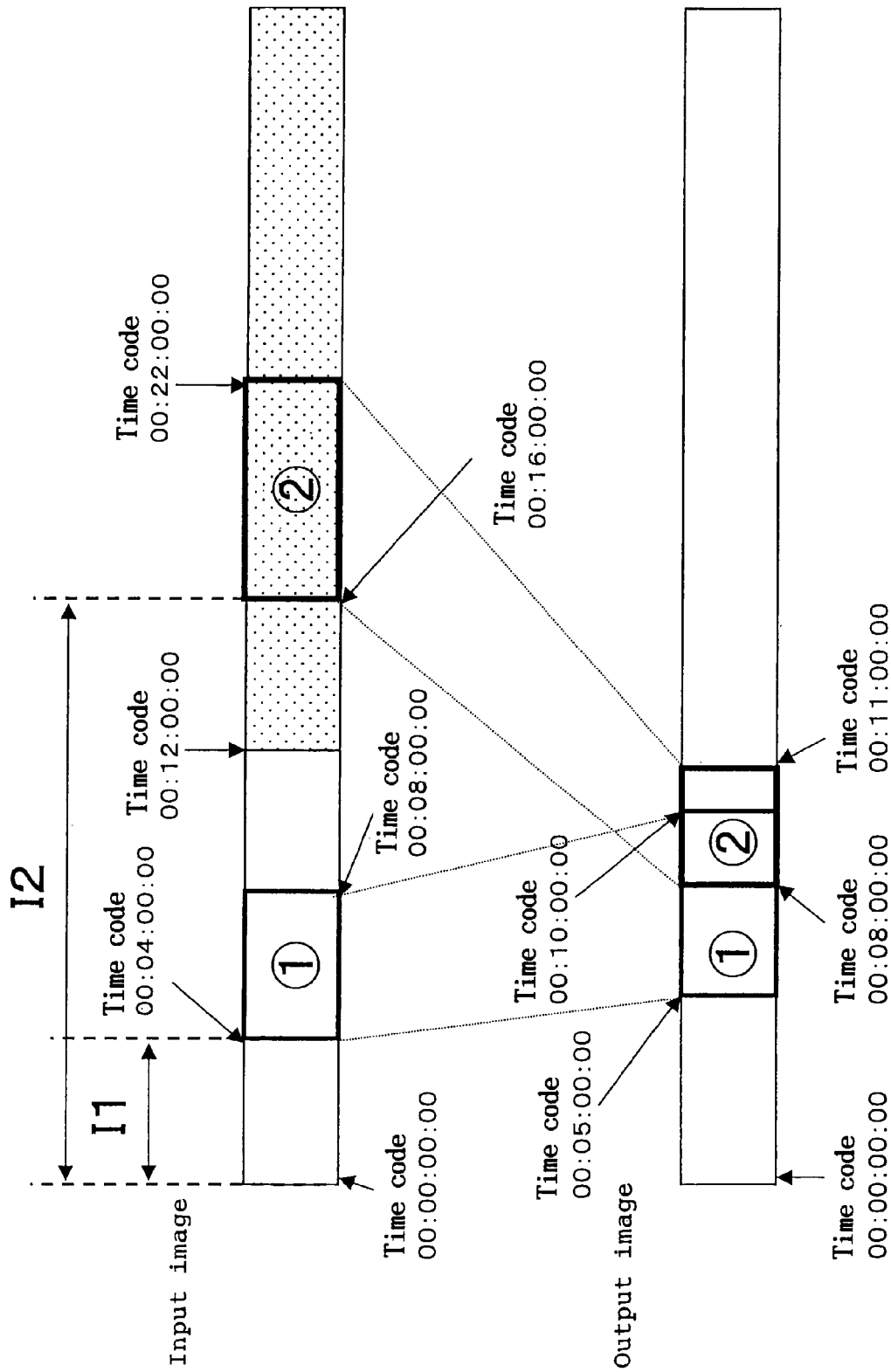
FIG. 10 is an explanatory view of the time code conversion according to a sixth embodiment of the present invention.

Next, the operation of the frame rate converting apparatus of the present embodiment will be described with reference mainly to FIG. 10 which is an explanatory view of the time code conversion of the sixth embodiment of the present invention.

In the following, a case will be concretely described where the sync point is 00:00:00:00.

In the present embodiment, like in the above-described fourth embodiment, a case will be described where a variable-speed frame rate image (image shot at 30 frames per second from 00:00:00:00 to 00:12:00:00 and at 12 frames per second from 00:12:00:00) is converted into an image of 24 frames per second.

Like in the above-described third embodiment, the time codes of the section ① of the output image are 00:05:00:00 to 00:10:00:00.

In the variable-speed frame rate image before conversion, the number of frames from the sync point to the time code 00:16:00:00 which is the starting point of the section ② of the input image is 11520 (=12×16×60) by performing conversion by use of 12 frames per second which is the frame rate of the input image at the starting point of conversion. In the image of 24 frames per second after conversion, this frame, which is the 11520-th frame from the sync point, has the time code 00:08:00:00.

As mentioned above, since the length of the section ② of the output image is 00:03:00:00, the time codes of the section ② of the output image are 00:08:00:00 to 00:11:00:00.

Like this, the output time codes assigned to the section ① are calculated so as to be continuous with the output time codes to be assigned to a virtual section I1 from 00:00:00:00 to 00:04:00:00. The output time codes assigned to the section ② are calculated so as to be continuous with the output time codes to be assigned to a virtual section I2 from 00:00:00:00 to 00:16:00:00.

In the present embodiment, it is to be noted that the frame rate of the input image at the starting point of conversion is used for such a calculation.

Conversely, in the image of 24 frames per second after conversion, the number of frames from the sync point to the time code 00:08:00:00 is also calculated to be 11520 (=24× 8×60). Therefore, in the variable-speed frame rate image before conversion, it can be immediately calculated that this frame, which is the 11520th frame from the sync point, has a time code 00:16:00:00.

That is, if the frame rate of the input image at the starting point of conversion is known, the time codes in the input image can be calculated back from the time codes in the output image.

However, since the input image is (not an image of a fixed frame but) a variable-speed frame rate image, the time codes before conversion and the time codes after conversion are (not in a one-to-one correspondence but) in a one-to-more than one correspondence.

Specifically, in the above-described embodiment, the time codes of the sections ① and ② overlap in the section from 00:08:00:00 to 00:10:00:00.

That is, although the input time codes can be calculated back from the output time codes because the conversion of the number of frames from the sync point is performed based on the frame rate at the starting point of conversion, the uniqueness of the output time codes is not ensured.

By thus providing the sync point, the input time codes can be easily obtained from the output time codes even when the input image is a variable-speed frame rate image.

Seventh Embodiment

Figure 3:
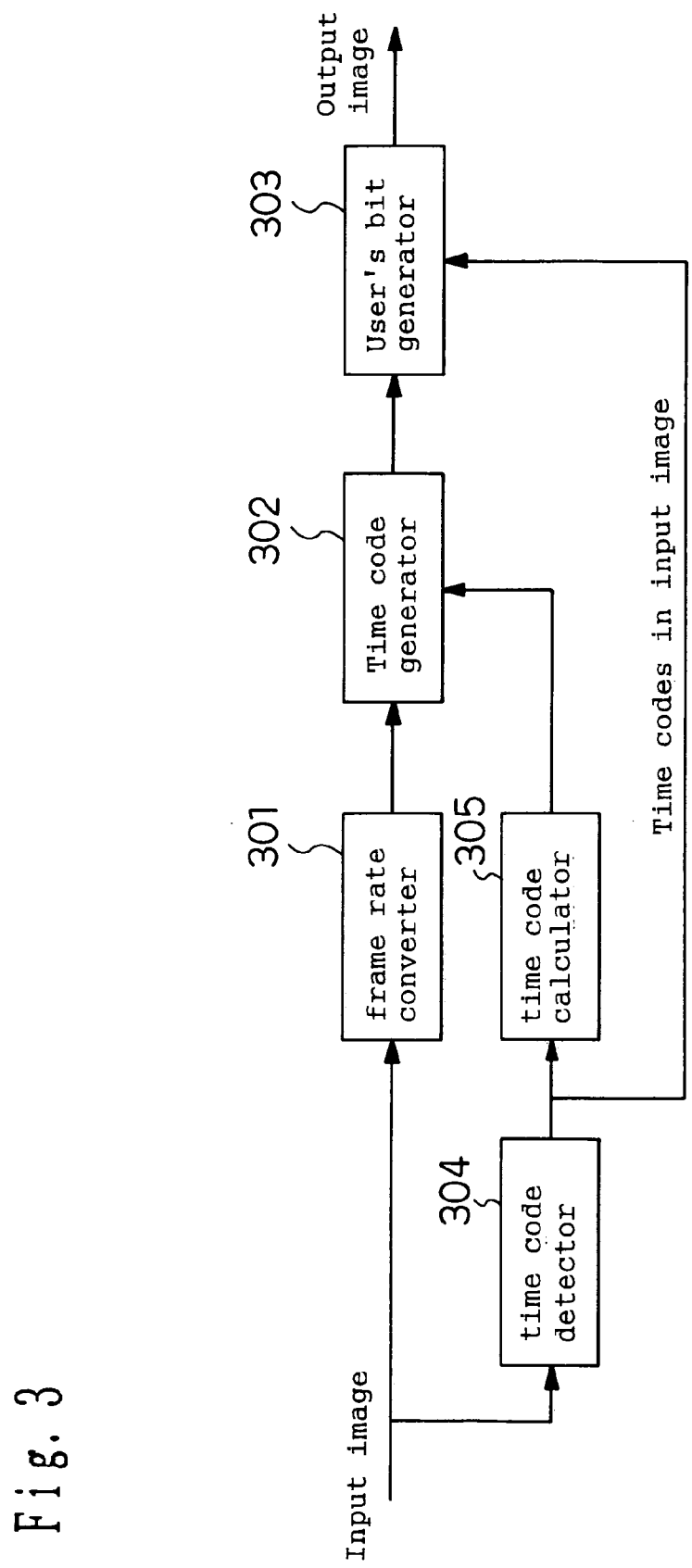
FIG. 3 is a structural view of a frame rate converting apparatus according to a seventh embodiment of the present invention.

First, the structure and operation of a frame rate converting apparatus of the present embodiment will be described with reference mainly to FIG. 3 which is a structural view of a frame rate converting apparatus of a seventh embodiment of the present invention.

The structure of the frame rate converting apparatus of the present embodiment is similar to that of the above-described frame rate converting apparatus of the first embodiment.

The present embodiment is characterized in that time codes in an input image are written into user's bits in the output image.

More specifically, the time codes in the input image detected by a time code detector 304 are stored into user's bits in the output image by a user's bit generator 303.

The frame rate converting apparatus of the present embodiment has a structure such that the user's bit generator 303 rewriting user's bits in the output image by use of the time codes in the input image detected by the time code detector 304 is added to the frame rate converting apparatus of the above-described first embodiment (see FIG. 1).

A frame rate converter 301 corresponds to the frame rate information converting means of the present invention, a time code calculator 305 corresponds to the output time code calculating means of the present invention, and a time code generator 302 corresponds to the output time code assigning means of the present invention. Moreover, the time code detector 304 corresponds to the input time code content detecting means of the present invention. Moreover, the user's bit generator 303 corresponds to the input time code predetermined bit storing means of the present invention. Moreover, the frame rate converting apparatus of the present embodiment corresponds to the signal processing apparatus of the present invention.

In the cases where the time code at the starting point of conversion in an input image and the time code at the starting point of conversion in an output image are synchronized with each other (see the above-described second and fifth embodiments) and where a sync point is provided (see the above-described third and sixth embodiments), the time codes in the input image can be calculated (reversely processed) from the time codes in the output image by use of the time code at the starting point of conversion in the output image, the frame rate of the input image and the frame rate of the output image.

However, to perform such a reverse processing, it is necessary to, after recording the frame rate of the input image into the output image, always manage the starting point of conversion.

In the present embodiment, since the time codes in the input image themselves are recorded into the output image, it is unnecessary to take the trouble to calculate the time codes in the input image, and the processing is thus simple.

For example, in a case where an image is disturbed when conversion or recording onto tape is performed, re-conversion can be easily performed by obtaining the time codes in the input image from the user's bits in the output image.

Eighth Embodiment

Figure 4:
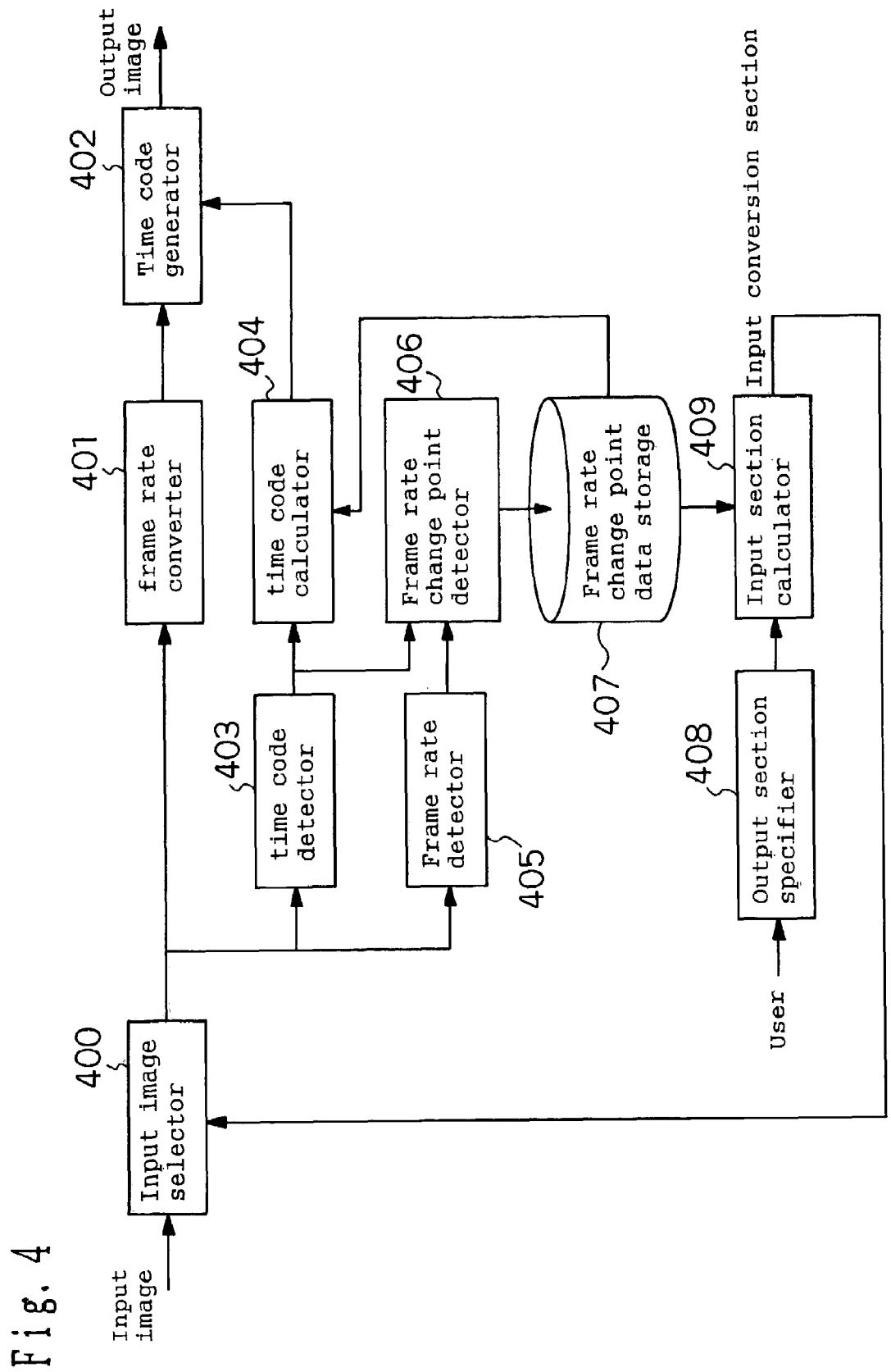
FIG. 4 is a structural view of a frame rate converting apparatus according to an eighth embodiment of the present invention.

First, the structure of a frame rate converting apparatus of the present embodiment will be described with reference mainly to FIG. 4 which is a structural view of a frame rate converting apparatus of an eighth embodiment of the present invention.

A frame rate change point detector 406 is means of receiving a time code detected by a time code detector 403 and a frame rate of the input image detected by a frame rate detector 405 and recognizing a change of the frame rate of the input image.

A frame rate change point data storage 407 is means of storing, as frame rate change point data, the time codes detected by the time code detector 403 and the frame rate of the input image detected by the frame rate detector 405 when a change of the frame rate of the input image is recognized.

An input section calculator 409 is means of calculating the input section where a corresponding input image is converted, by use of the output section specified by an output section specifier 408 according to the user's instruction and the above-mentioned frame rate change point data.

An input image selector 400 is means of extracting the section, of the inputted input image, corresponding to the input section where the input image is converted.

A frame rate converter 401 is means of performing frame rate conversion on the extracted section of the input image.

A time code generator 402 is means of replacing the time codes in the output image on which frame rate conversion is performed.

The frame rate converter 401 corresponds to the frame rate information converting means of the present invention, the time code calculator 404 corresponds to the output time code calculating means of the present invention, and the time code generator 402 corresponds to the output time code assigning means of the present invention. Moreover, the time code detector 403 corresponds the input time code content detecting means of the present invention. Moreover, the frame rate change point detector 406 corresponds to the frame rate change detecting means of the present invention, and the input section calculator 409 corresponds to the input time code reversely calculating means of the present invention. Moreover, the frame rate converting apparatus of the present embodiment corresponds to the signal processing apparatus of the present invention.

Figure 11:
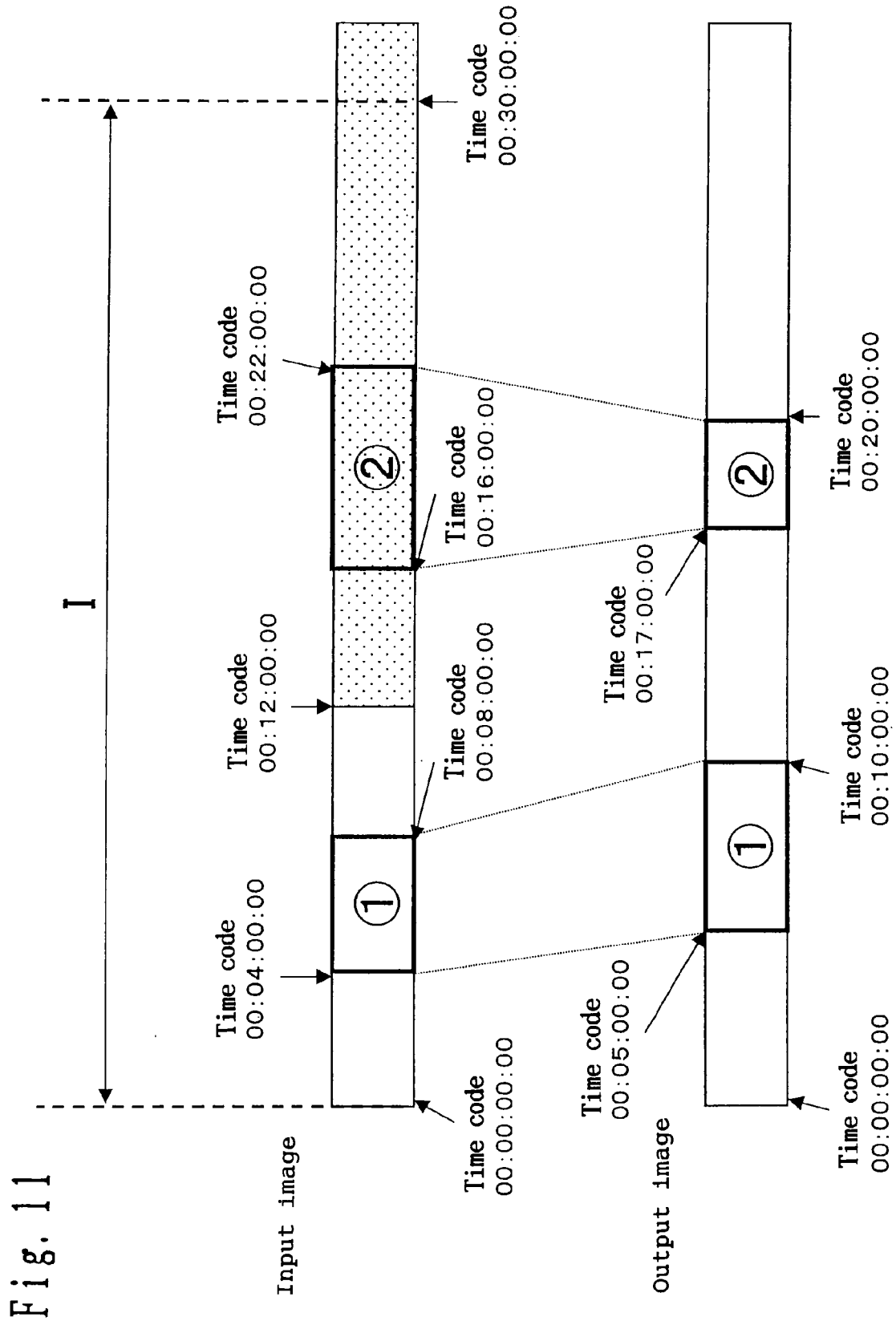
FIG. 11 is an explanatory view of the time code conversion according to an eighth embodiment of the present invention.

Next, the operation of the frame rate converting apparatus of the present embodiment will be described with reference mainly to FIG. 11 which is an explanatory view of the time code conversion of the eighth embodiment of the present invention.

In the present embodiment, the output time codes assigned to a single or a plurality of sections subject to conversion are calculated so as to coincide with the output time codes to be collectively assigned to a virtual section including the single or plurality of sections.

More specifically, as described below in detail, the number of frames from the sync point is calculated by obtaining the cumulative sum of the number of frames.

The frame rate change point detector 406 transmits frame rate change point data (30 frames per second, 00:00:00:00) to the frame rate change point data storage 407.

The frame rate change point detector 406 transmits frame rate change point data (12 frames per second, 00:12:00:00) to the frame rate change point data storage 407 when it is detected that the frame rate is switched from 30 frames per second to 12 frames per second at 00:12:00:00.

In this manner, a pair of a frame rate and a time code is stored as the frame rate change point data by the frame rate change point data storage 407 every time the frame rate is changed.

The time code calculator 404 calculates the time codes by use of the above-mentioned frame rate change point data.

Now, a method of calculating the output time codes from the input time codes will be concretely described.

Like in the above-described sixth embodiment, the time codes of the section ① of the output image are 00:05:00:00 to 00:10:00:00.

The number of frames from the sync point to 00:16:00:00 which is the starting point of the section ② of the input image is 24480 frames which is the sum of the number of frames 21600 (=30×12×60) to 00:12:00:00 at 30 frames per second and the number of frames 2880 (=12×(16−12)×60) from 00:12:00:00 at 12 frames per second.

This number of frames is 00:17:00:00 when converted with respect to 24 frames per second.

The length of the section ② of the output image is 00:03:00:00 as explained in the above-described fourth embodiment.

Therefore, in the present embodiment, the output image of the section ② is from 00:17:00:00 to 00:20:00:00.

As described above, the output time codes assigned to the sections ① and ② are calculated so as to coincide, for example, with the output time codes to be collectively assigned to a virtual section I from 00:00:00:00 to 00:30:00:00.

In the present embodiment, it is to be noted that the cumulative sum of the number of frames from the sync point is used for such a calculation.

Conversely, the input section calculator 409 calculates input time codes from output time codes by use of the frame rate change point data.

Now, a method of calculating input time codes from output time codes will be concretely described.

In the following, a case will be described where the time code in the input image corresponding to 00:17:00:00 which is the starting point of the section ② of the output image (that is, the time code at the starting point of the section ② of the input image) is calculated.

First, it is determined within which frame rate range the time code at the starting point of the section ② of the input image falls.

The number of frames from the sync point to the starting point of the section ② of the output image is 24480 (=24×17×60) when converted with respect to 24 frames per second.

The range of the section where the frame rate of the input image is 30 frames per second is a range where the frame number is 0 to 21600 (=30×12×60<24480).

Therefore, the time code at the starting point of the section ② of the input image does not fall within the range of the section where the frame rate of the input image is 30 frames per second.

On the other hand, the end of the region of the section where the frame rate of the input image is 12 frames per second is not specified.

Therefore, the time code at the starting point of the section ② of the input image falls within the range of the section where the frame rate of the input image is 12 frames per second.

From this, the time code at the starting point of the section ② of the input image is nothing but the time code where the number of frames from the starting point of the section, of the input image, where the frame rate is 12 frames per second, is 2880 (=24480−21600).

The number of frames 2880 corresponds to 00:04:00:00 when converted with respect to 12 frames per second.

From the above, the time code at the starting point of the section ② of the input image is calculated to be 00:16:00:00 by considering the frame rate change point data (12 frames per second, 00:12:00:00).

Likewise, the time code at the end point of the section ② of the output image is calculated to be 00:21:59:29.

In the present embodiment, the number of frames from the sync point is calculated by obtaining the cumulative sum of the number of frames. Consequently, even when the input image is a variable-speed frame rate image, the uniqueness of the output time codes is ensured, so that the input time codes can be uniquely identified from the output time codes.

Moreover, in the present embodiment, since the input time codes can be uniquely identified from the output time codes, it is not difficult to extend the section of use of the output image. For example, it is unnecessary to count the number of frames while rewinding the input image, and it can be easily performed to go back by a desired number of frames to re-convert the frame rate.

In the above, the first to eighth embodiments are described in detail.

As described above, when an image is converted into a predetermined frame rate, time codes can be efficiently assigned at high speed without any manual intervention. Needless to say, such an effect is produced even when the numerical values such as frame rates are other than those in the above-described embodiments.

The program of the present invention is a program of causing a computer to execute the operations of all or some of the steps (or processes, operations, workings or the like) of the above-described signal processing method of the present invention, said program operating in concert with the computer.

Moreover, the recording medium of the present invention is a recording medium holding a program of causing a computer to execute all or some of the operations of all or some of the steps (or processes, operations, workings or the like) of the above-described signal processing method of the present invention, said recording medium being computer-readable and said program that is read out performing the operations in concert with the computer.

The above-mentioned "some of the steps (or processes, operations, workings or the like)" of the present invention means one or some steps of the plurality of steps.

Moreover, the above-mentioned "the operations of the steps (or processes, operations, workings or the like)" of the present invention means all or some operations of the steps.

Moreover, a usage of the program of the present invention may be such that the program is recorded on a computer-readable recording medium and operates in concert with a computer.

Moreover, a usage of the program of the present invention may be such that the program is transmitted over a transmission medium, is read out by a computer and operates in concert with the computer.

Moreover, the recording medium includes ROMS, and the transmission medium includes: transmission media such as the Internet; light; radio waves; and sound waves.

Moreover, the above-mentioned computer of the present invention is not limited to pure hardware such as a CPU, but may include firmware, an OS, and peripherals.

As described above, the structure of the present invention may be implemented either via software or via hardware.

The present invention has the advantage of being capable of automatically assigning time codes after conversion to an image after frame rate conversion.

The invention claimed is:

1. A signal processing apparatus comprising:
frame rate information converting means of performing conversion of frame rate information on a frame rate, on all, a single or a plurality of sections of a video signal having an input time code, the video signal being externally inputted and generated by use of a frame rate that changes or does not change;
output time code calculating means of performing calculation of an output time code to be replaced with the input time code, on all, single or plurality of sections where the conversion of the frame rate information is performed; and
output time code assigning means of assigning the calculated output time code to all, single or plurality of sections where the conversion of the frame rate information is performed,
wherein the conversion of the frame rate information is performed, on the sections of the video signal, so that the number of frames of the video signal is not changed between before and after the conversion of the frame rate information.

2. A signal processing apparatus according to claim 1, further comprising input time code content detecting means of performing detection of a content of the input time code, on all, single or plurality of sections,
wherein the calculation of the output time code is performed in consideration of a result of the detection of the content of the input time code.

3. A signal processing apparatus according to claim 2, wherein the output time code assigned to the sections is calculated so that the output time code assigned to a starting frame where the sections are started substantially coincides with the input time code detected on the starting frame.

4. A signal processing apparatus according to claim 3, further comprising output time code adjusting means of adjusting the output time code assigned to the starting frame.

5. A signal processing apparatus according to claim 1, wherein the output time code assigned to a predetermined section of the plurality of sections is calculated so as to be continuous with the output time code assigned to a section, of the plurality of sections, that immediately precedes the predetermined section.

6. A signal processing apparatus according to claim 1, wherein the output time code assigned to the single or plurality of sections is calculated so as to be continuous with the output time code to be assigned to a virtual section from a predetermined reference frame to a starting frame where the sections are started.

7. A signal processing apparatus according to claim 1, wherein the output time code assigned to the single or plurality of sections is calculated so as to substantially coincide with the output time code to be collectively assigned to a virtual section including the single or plurality of sections.

8. A signal processing apparatus according to claim 1, further comprising input time code predetermined bit storing means of performing storage of the detected input time code into a predetermined bit, on all, single or plurality of sections where the conversion of the frame rate information is performed.

9. A signal processing apparatus according to claim 1,
wherein the externally inputted video signal is generated by use of a frame rate that changes,
frame rate change detecting means of performing detection of a change of the frame rate on the externally inputted video signal is further provided, and
the calculation of the output time code is performed in consideration of a result of the detection of a change of the frame rate.

10. A signal processing apparatus according to claim 9,
wherein the output time code is calculated so as to be in a one-to-one correspondence with the input time code, and
input time code reversely calculating means of reversely calculating the input time code from the output time code based on a correspondence of the one-to-one correspondence is further provided.

11. A signal processing method comprising:
a frame rate information converting step of performing conversion of frame rate information on a frame rate, on all, a single or a plurality of sections of a video signal having an input time code, the video signal being externally inputted and generated by use of a frame rate that changes or does not change;
an output time code calculating step of performing calculation of an output time code to be replaced with the input time code, on all, single or plurality of sections where the conversion of the frame rate information is performed; and an output time code assigning step of assigning the calculated output time code to all, single or plurality of sections where the conversion of the frame rate information is performed, wherein the conversion of the frame rate information is performed, on the sections of the video signal, so that the number of frames of the video signal is not changed between before and after the conversion of the frame rate information.

12. A program of causing a computer to execute the following steps of the signal processing method according to claim 11: a frame rate information converting step of performing conversion of frame rate information on a frame rate, on all, a single or a plurality of sections of a video signal having an input time code, the video signal being externally inputted and generated by use of a frame rate that changes or does not change; an output time code calculating step of performing calculation of an output time code to be replaced with the input time code, on all, single or plurality of sections where the conversion of the frame rate information is performed; and an output time code assigning step of assigning the calculated output time code to all, single or plurality of sections where the conversion of the frame rate information is performed.

13. A recording medium holding the program according to claim 12, said recording medium being computer-processable.

* * * * *